United States Patent [19]

Curchod et al.

[11] 4,236,315
[45] Dec. 2, 1980

[54] SENSOR ASSEMBLY FOR WHEEL ALIGNMENT SYSTEM

[75] Inventors: Donald B. Curchod, Saratoga; Wilhelm Borner, Cupertino, both of Calif.

[73] Assignee: Nortron Corporation, Sunnyvale, Calif.

[21] Appl. No.: 941,756

[22] Filed: Sep. 13, 1978

[51] Int. Cl.³ .............................................. G01B 7/315
[52] U.S. Cl. ................................................... 33/203.18
[58] Field of Search ........... 33/203.18, 203.12, 203.13, 33/203.15, 203.16, 203.17, 203.21, 288, 1 PT, 336, 228

[56] References Cited

U.S. PATENT DOCUMENTS

| | | | |
|---|---|---|---|
| 3,164,910 | 1/1965 | Manlove | 33/203.18 |
| 3,199,208 | 8/1965 | Hunter | 33/336 |
| 3,443,318 | 5/1969 | MacMillan | 33/203.18 |

*Primary Examiner*—Willis Little
*Attorney, Agent, or Firm*—Allegretti, Newitt, Witcoff & McAndrews

[57] ABSTRACT

In a system for aligning a wheel employing means for generating electrical signals indicative of camber, toe and the rotational position of the wheel when the camber and toe readings are sensed employs an improved sensor assembly for generating the toe readings. The same sensor assembly can also be used with respect to providing a reference with respect to certain rear wheel relationships.

5 Claims, 9 Drawing Figures

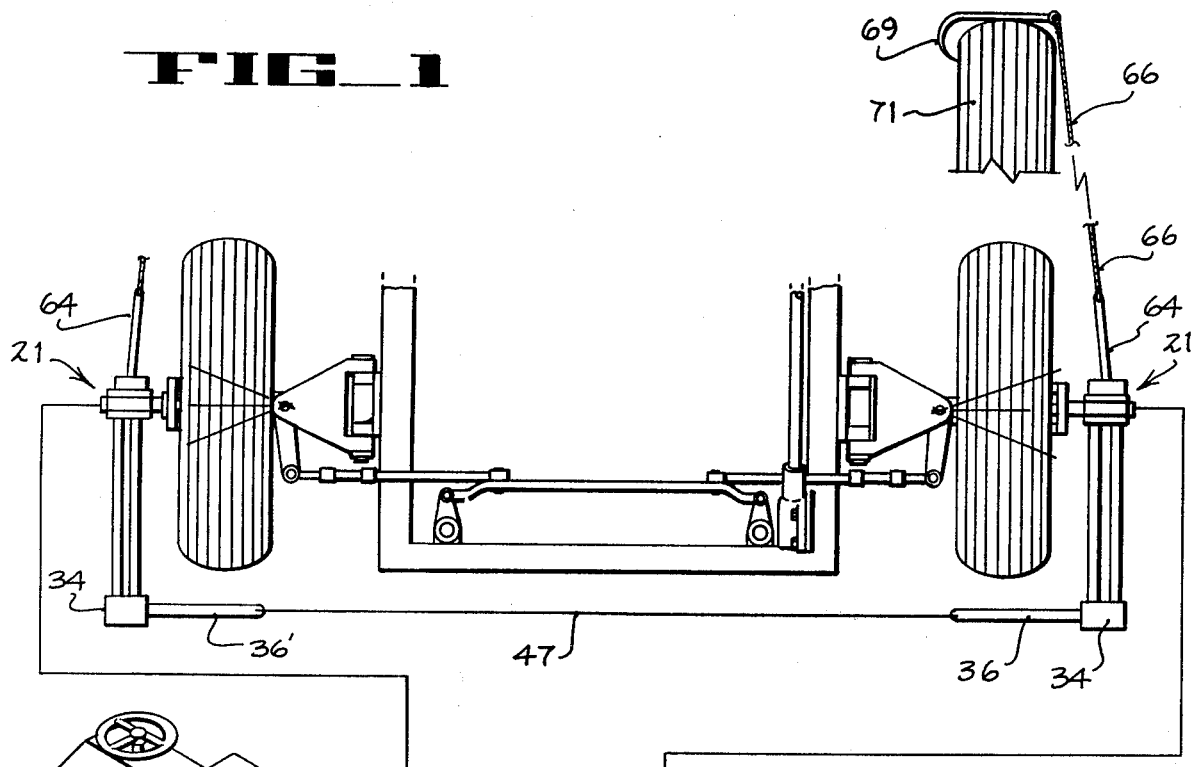
FIG_1
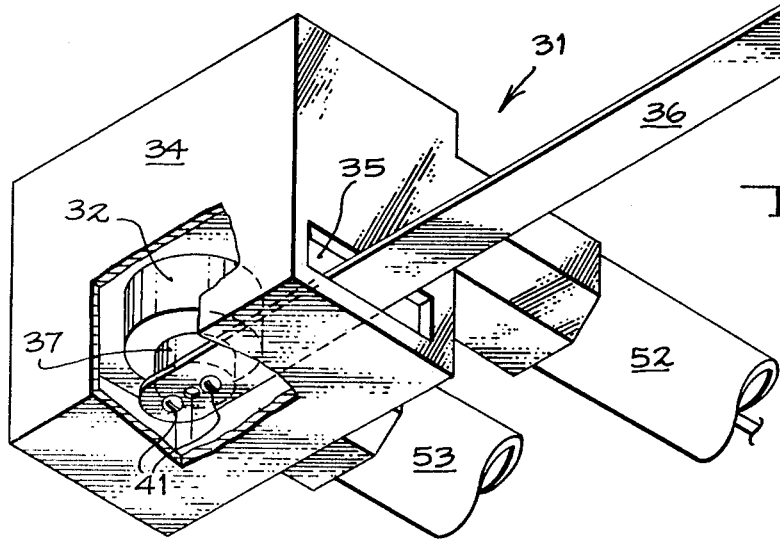
FIG_2

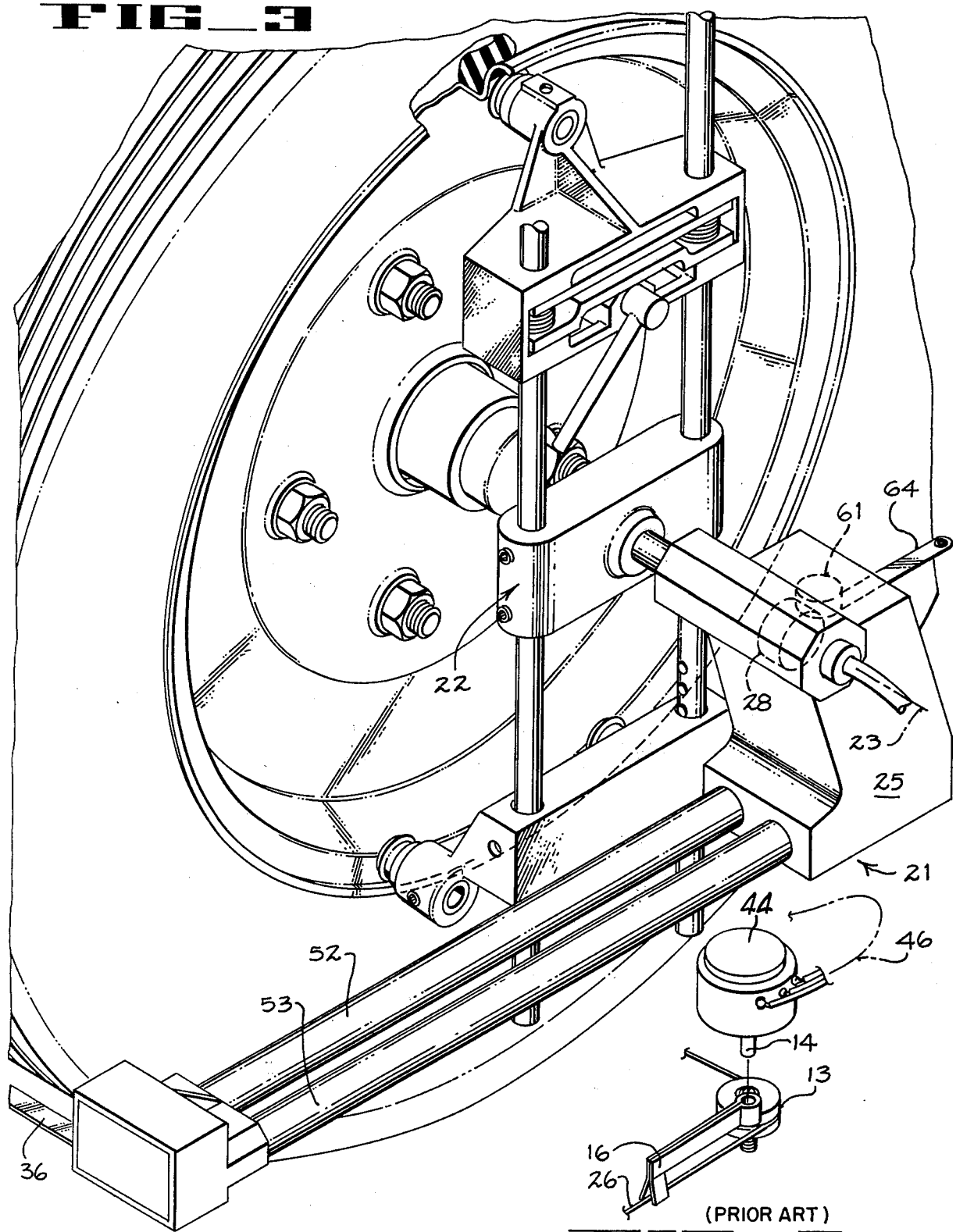

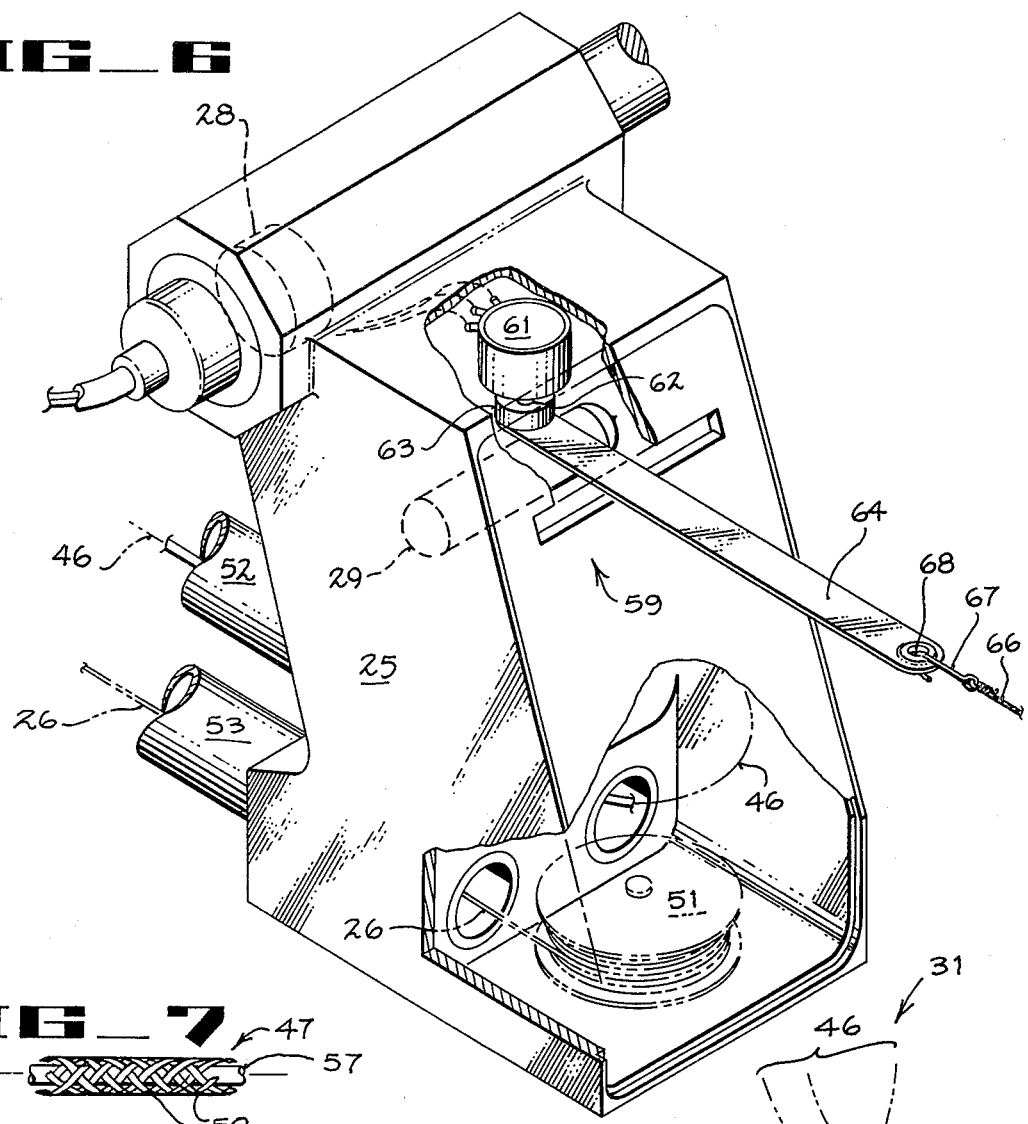
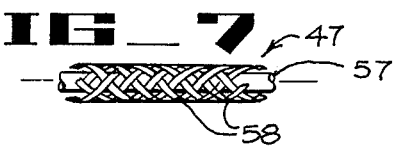
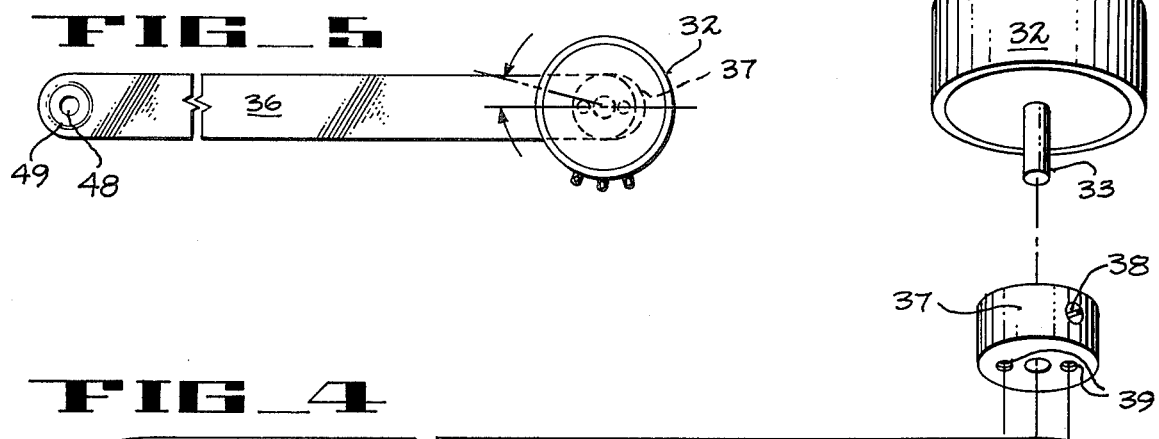
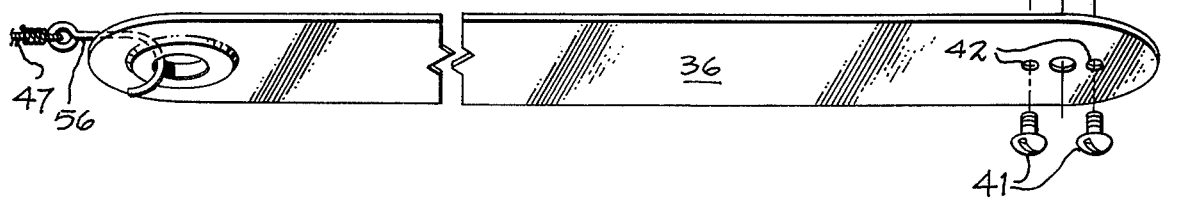

4,236,315

SENSOR ASSEMBLY FOR WHEEL ALIGNMENT SYSTEM

BACKGROUND OF THE INVENTION

This invention pertains to wheel alignment systems and more particularly to such systems as provide electrical signals representative of camber, toe and the rotational position of a wheel when the camber and toe readings are sensed. More particularly this invention pertains to an improved sensor assembly for providing toe readings in an alignment system of the kind described.

Heretofore in providing electrical signals representative of toe readings for a given wheel, according to one arrangement (FIG. 8) a potentiometer 44 is provided at the free end of an elongate transducer support assembly 21 carried from a wheel clamp assembly 22 mounted to the wheel. As shown in phantom lines in FIG. 6 a substantially inelastic cable 26 is wrapped about a spring wound reel 51 for applying tension to cable 26. Further, cable 26 is trained about a pulley 13 (FIG. 8) leading to reel 51. In this arrangement the bifurcated end of guide arm 16 straddles cable 26 and serves to rotate a wiper pin 14 for operating potentiometer 44 at the other end of arm 16.

It has been observed that under certain circumstances, some loss in accuracy and repeatability can be detected in the foregoing arrangement.

Accordingly, Applicant has provided herein an improved sensor assembly for toe and rear wheel readings.

SUMMARY OF THE INVENTION AND OBJECTS

In general an improved sensor assembly for sensing angles in a wheel alignment system comprises a potentiometer carried by a transducer support assembly and an elongate lever arm carried at one end from the wiper of the potentiometer. An elastic cable coupled to the other end of the arm applies a yielding force to operate the lever arm.

It is an object of the present invention to provide an improved sensor assembly for a wheel alignment system.

More particularly it is an object of the invention to provide such an improved sensor assembly as employed in conjunction with generating signals representative of the toe angle of a wheel or representative of a rear wheel reference angle.

It is another object of the present invention to provide an improved angle of toe sensor assembly for a wheel alignment system in which an elastic cable is directly coupled between lever arms operating the wipers of potentiometers carried at the forward ends of transducer support assemblies mounted on the front wheels of a vehicle, or a rear wheel reference angle sensor assembly in which an elastic cable is directly coupled between the free end of a lever arm operating the wiper of a potentiometer carried by a vehicle's front wheel and the rear edge of a rear wheel disposed on the same side of the vehicle as the front wheel.

The foregoing and other objects of the invention will become more readily evident from the following detailed description of preferred embodiments when considered in conjunction with the drawings.

BRIEF DESCRIPTION OF THE DRAWINGS

FIG. 1 shows a diagrammatic view of a system employing an improved toe sensor assembly according to the invention;

FIG. 2 shows an enlarged perspective view as seen from below of a leading portion of a transducer support assembly with portions broken away for clarity according to the invention;

FIG. 3 shows a perspective view of a transducer support assembly carried from a wheel clamp assembly on a front wheel of a vehicle according to the invention;

FIG. 4 shows an exploded perspective view (as seen from below) of a sensor assembly according to the invention;

FIG. 5 shows a top plan view of a sensor assembly according to the invention;

FIG. 6 shows a perspective view of a transducer support assembly including a rear wheel reference sensor assembly according to one embodiment of the invention;

FIG. 7 shows an enlarged detail view of a portion of the cable shown in FIGS. 1 and 4;

FIG. 8 shows an exploded perspective view of a toe sensor assembly as previously known; and FIG. 9 shows a plan view of means carried by the free end of a lever arm for coupling to an end of an elastic cable.

DETAILED DESCRIPTION OF PREFERRED EMBODIMENTS

In a wheel alignment system of known construction, sensors for detecting pertinent physical positions of a wheel to be aligned are contained in a transducer support assembly 21 as shown in FIG. 3. Assembly 21 is slung pivotally in bearings from a wheel clamp assembly 22 carried by the vehicle wheel being aligned. Thus assembly 22 pivots about the axis 23 of its associated wheel axle whereby assembly 22 rotates with the wheel independently of assembly 21. Transducer support assemblies 21 on each side of the vehicle (as shown in FIG. 1) include a head assembly 31 carried forwardly of the wheels at a position whereby a cable 47 can be coupled therebetween to cause the head assembly 31 to detect the toe angle of the wheels in response to steering movements. The cable as heretofore employed is maintained under tension by a spring loaded reel 51 shown in phantom lines in FIG. 6.

Each support assembly 21 carries a runout sensor 28 which generates information indicative of the rotational position of the wheel; a camber sensor 29 which generates information indicative of the camber of the wheel; and a toe sensor 44 in the leading end of the arms 52, 53 which generates information indicative of the toe angle of its associated wheel.

Previously toe angle has been derived by training a cable 26 around a pulley 13 carried at the end of the pair of elongate support arms 52, 53 whereby cable 26 will rotate pulley 13 while maintained under tension. The pulley movement operates the wiper of potentiometer 44 (FIG. 8) carried at the distal end of arms 52, 53 by movement of guidearm 16.

Accordingly, as support arms 52, 53 are moved from left to right with steering movements of a wheel to which they are supported toe sensor 44 will provide an electrical output via leads 46 as shown in FIG. 6.

Heretofore, a spring-wound reel 51 serves to provide tension in the cable 26 trained around pulley 13. Some limited error has, under certain circumstances, been discovered in the electrical readout of toe sensor 44.

As disclosed herein an improved toe sensor assembly 31 comprises a potentiometer 32 carried at the distal end of support arms 52, 53 in a manner disposing the wiper connecting pin 33 to depend downwardly from potentiometer 32 within the housing 34 joining the ends of arms 52, 53.

Means for coupling an elongate lever arm 36 to operate wiper connecting pin 33 comprises an annular collar 37 formed with a central opening for receiving pin 33 therein. A set screw 38 serves to bind collar 37 to pin 33 for rotation therewith.

A pair of diametrically disposed threaded openings 39 serve to receive retaining screws 41 passing through the small mounting openings 42 in one end of lever arm 36.

As thus arranged movement of lever arm 36 serves to control the movement of a wiper associated with wiper connecting pin 33 to provide electrical signals on leads 46 representative of toe movement.

The other end of lever arm 36 includes means for readily engaging a yieldingly extensible, i.e. elastic cable disposed to extend across the front of the vehicle to a similar lever arm 36' carried on the other front wheel being aligned. Thus, the distal end of lever arm 36 includes an opening 48 reinforced about its edge by a metallic grommet 49 in order to preserve a smooth edge surface.

Elastic cable 47 carries means such as hook 56 for engaging lever arm 36. Each end of cable 47 includes such a hook 56 for engaging an associated lever arm 36, 36'.

Lever arm 36, though substantially rigid in a horizontal plane for movement between advanced and retracted positions through an angle in a substantially horizontal plane serves to vary the output of potentiometer 32. On the other hand lever arm 36 is relatively flexible in a vertical direction so as to prevent damage to pin 33 or potentiometer 32 in view of the relatively exposed position of arm 36 extending out of the opening 35 of housing 34.

FIG. 7 shows an enlarged section of a portion of cable 47 which discloses an elongate elastic element 47 enclosed within a woven protective covering 58.

The openness of the weave of covering 58 is quite exaggerated as shown for purposes of clarity but serves to permit element 47 to stretch freely.

In operation, the foregoing apparatus serves to apply a yielding tension to the ends of each of two lever arms 36, 36' as shown in FIG. 1 whereby as the front wheels of a vehicle are moved from right to left and vice versa the toe angle will be accurately detected by the lever arm movements directly operating an associated potentiometer 32.

From the foregoing it will be readily evident that there has been provided an improved toe sensor assembly for a wheel alignment system of the kind described.

Means providing a rear wheel reference input to the system of FIG. 1 comprises sensor assembly 59 carried within housing 25 of assembly 21. Thus, sensor assembly 59 comprises the potentiometer 61 having a wiper operating pin 62 carrying a collar 63 fixed thereto.

A rearwardly extending lever arm 64 secured to collar 63 as noted above with respect to the embodiment of FIG. 4 moves through an angle for operating potentiometer 61. Lever arm 64 is made of flexible steel so as to flex upwardly while being substantially rigid for lateral movement. As thus arranged, an elastic cable 66 formed with a hook 67 couples easily into the grommet lined opening 68 at one end of cable 66. The other end of cable 66 carries a hook 69 for engaging either the tread portion or the inner side wall of the tread portion of the rear wheel 71 located generally behind the front wheel carrying assembly 21 so as to provide a rear wheel reference angle to be supplied to the system of FIG. 1 dependent upon the movement of lever arm 64.

It has been observed that friction between hook 56 and grommet 49 can introduce a slight variation to the inputs taken from the potentiometers 32 or 61. Accordingly, as shown in FIG. 9 lever arm 36 or 64 is coupled to its associated cable 47 or 66 at each end by means comprising a fitting 62 having a flat mounting portion 73 formed with an elongate mounting slot 74 whereby rivets 76 or other fastening means can secure fitting to the flat surface of arm 36 or 64.

Fitting 72 further includes a barrel shaped portion 77 having a corrugated surface whereby a bifurcated clamping element 78 can be crimped around portion 77 to capture an end of a flexible connecting leader 79. The other end of leader 79 is secured to a similar barrel-shaped portion 81 of a hook 82 for engaging a loop in the end of cable 47, 66.

In operating, lead 79 merely bends and therefore produces minimal resistance, i.e. limited to the friction between fibers in leader 79 to provide an improved coupling.

We claim:

1. In a wheel alignment system of a type having a transducer support assembly, means carrying said assembly from a wheel to be aligned and serving to permit the wheel to rotate on its axis independently of said assembly and sensing means serving to provide an electrical indication of the angle of toe of the wheel, said sensing means comprising elongate means carried by and disposed to extend forwardly alongside the wheel to a position beyond the leading portion of a tire carried by said wheel, a potentiometer carried at the distal end of said elongate means, an elongate lever arm coupled at one end to move the wiper of said potentiometer, said lever arm being movable between advanced and retracted positions to vary the output of said potentiometer, and means serving to yieldingly apply tension to the distal end of said lever arm for operating said wiper to provide an electric signal representative of the angle between said lever arm and said elongate means in response to steering movements of said wheel said lever arm being readily flexible for movement in a vertical plane while being substantially rigid in a generally horizontal plane for operating said wiper, the flexibility of said lever arm serving to isolate movements of the distal end of said lever arm from the proximal end thereof as the wheel is rotated.

2. In a wheel alignment system of a type having a transducer support assembly, means for carrying said assembly from a wheel to be aligned, the last named means serving to permit the wheel to rotate on its axis substantially independently of said assembly, sensor means carried by said assembly for electrically indicating the angle of toe for the wheel carrying said assembly, said sensor means comprising a variable voltage device carried on a forwardly protruding portion of said assembly, said variable voltage device having means for varying the voltage thereof, and an elongate, thin, flat lever arm flexible in a generally vertical direction and substantially rigid in a horizontal plane, the proximal of said lever arm being directly coupled to move with said means for varying the voltage, and yieldingly extensible cable means connected to the distal end of said lever arm, the flexibility of said lever arm serving the isolate movement of the distal end of said lever arm from the proximal end thereof as the wheel is rotated.

3. In a wheel alignment system of a type having a transducer support assembly, means for carrying said assembly from a wheel and serving to permit the wheel to rotate on its axis substantially independently of the assembly, sensor means carried by said assembly for providing electrical information representative of an angle associated therewith, said sensor means comprising a variable voltage device carried by said transducer support assembly, said variable voltage device having means for varying the voltage thereof, and an elongate, thin, flat lever arm flexible in a generally vertical direction and substantially rigid in a generally horizontal plane, the proximal of said lever arm being directly coupled to move with said means for varying the voltage, and yieldingly extensible cable means connected to the distal end of said lever arm for positioning the arm to vary the voltage of said device for electrically indicating the size of an angle, the flexibility of said lever arm serving the isolate movement of the distal end of said lever arm from the proximal end thereof as the wheel is rotated.

4. In a wheel alignment system according to claim 3 comprising means for mounting said transducer support assembly from a front wheel of a vehicle, said assembly carrying said sensor in a manner directing said lever arm to extend rearwardly from said assembly, and means at the free end of said cable means for engaging a rear tire of a vehicle associated with said support assembly for detecting a rear wheel reference angle.

5. In a wheel alignment system according to claim 3 in which said means for carrying said transducer support assembly from a wheel of a vehicle carries said support assembly from a front wheel of a vehicle, said cable means being extended rearwardly from said sensor means to engage a rear portion of a rear wheel of the vehicle.

* * * * *